United States Patent [19]

Bentsen

[11] 4,108,498

[45] Aug. 22, 1978

[54] GARBAGE SUCTION PLANT

[75] Inventor: Thomas Valdemar Bentsen, Aarhus, Denmark

[73] Assignee: Bruun & Sorensen A/S, Aarhus C, Denmark

[21] Appl. No.: 668,982

[22] Filed: Mar. 22, 1976

[30] Foreign Application Priority Data

Mar. 21, 1975 [DK] Denmark ............................ 1224/75

[51] Int. Cl.[2] .............................................. B65G 53/06

[52] U.S. Cl. ................................ 302/27; 137/614.21; 302/42

[58] Field of Search ....................... 302/17, 27, 36, 42; 137/614.21, 624.18, 624.2

[56] References Cited

U.S. PATENT DOCUMENTS

| | | | |
|---|---|---|---|
| 2,833,301 | 5/1958 | Argus | 137/614.21 X |
| 3,291,154 | 12/1966 | Bounds | 137/624.18 |
| 3,490,813 | 1/1970 | Hallstrom | 302/27 X |
| 3,953,078 | 4/1976 | Aitken | 302/27 |

FOREIGN PATENT DOCUMENTS

| | | | |
|---|---|---|---|
| 1,429,835 | 12/1966 | France | 302/36 |
| 502,106 | 11/1954 | Italy | 302/36 |
| 1,084,689 | 9/1967 | United Kingdom | 302/27 |

*Primary Examiner*—Evon C. Blunk
*Assistant Examiner*—James L. Rowland
*Attorney, Agent, or Firm*—Fleit & Jacobson

[57] ABSTRACT

A garbage suction system having a number of chutes connected to a common horizontal main transport duct, leading to a collection centre having a suitable air suction means, is provided with specially constructed air inlet valves at selected locations. Each chute is provided with a fork type obstruction at the bottom to loosely suspend the garbage, and the air inlet valves are located in the main transport duct at locations such that at least one chute is between the valve and the suction means. In operation a valve will first sense the suction effect and open the transport duct to the atmosphere, thereby providing a sufficient pressure drop across the garbage loosely suspended in a chute so as to cause the restrained garbage to be sucked away. The valve is provided with an automatic closing means so that the operating sequence may be then repeated.

5 Claims, 4 Drawing Figures

GARBAGE SUCTION PLANT

Figure 1:
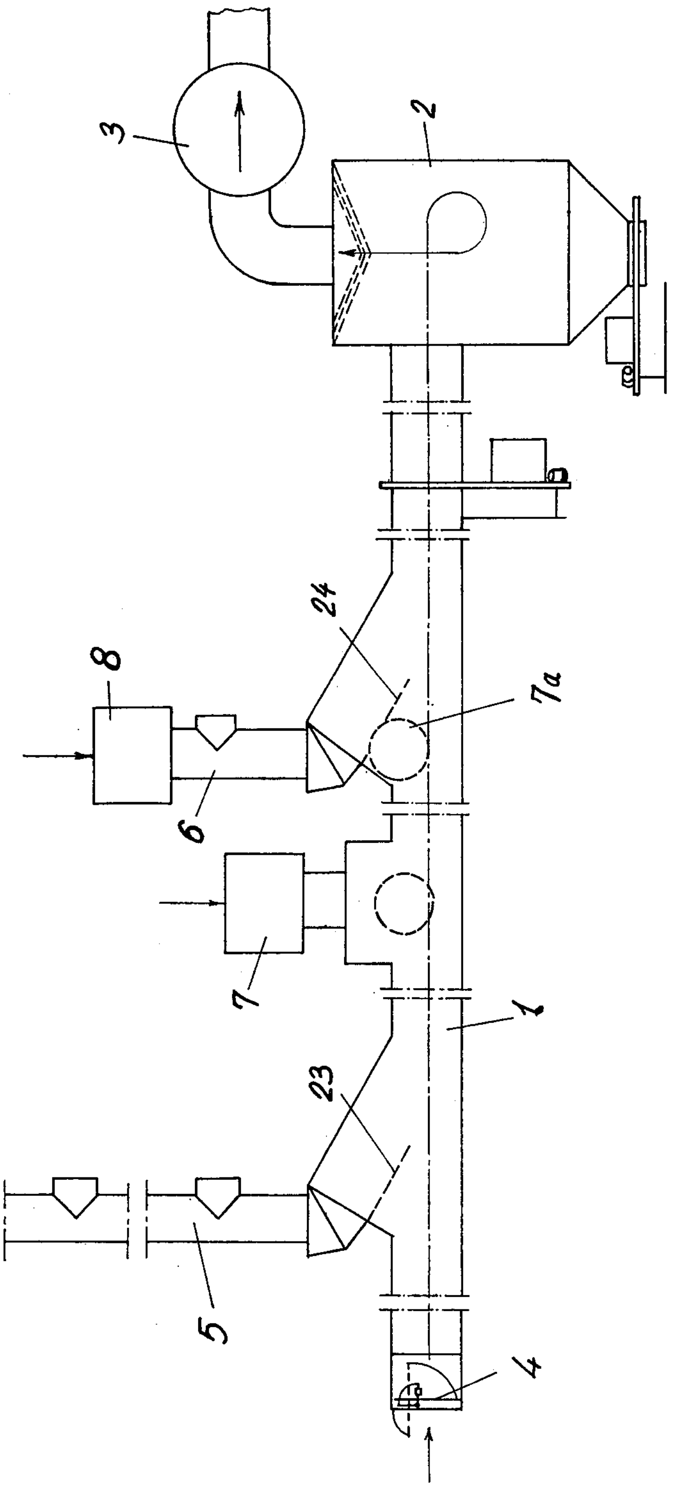

The invention relates to a garbage suction plant of the kind in which a number of garbage chutes are leading into a common mainly horizontal transport duct ending in a collecting centre with a suction installation.

The chutes are, in the case of plants of the said description, provided at the bottom with an airtight restraining mechanism, preventing the garbage from falling down into the transport duct, and generally closed. Each transport duct is sucked out e.g. once in every 24 hours, by simultaneously releasing the mentioned restraining mechanisms, for instance successively or by opening a few at a time.

Already known plants require accordingly partly automatic control, i.e., usually remote control automation to operate the restraining mechanisms, and partly that the restraining mechanisms concerned are mounted in the chutes. If we otherwise assume that there were no restraining mechanisms at the bottom of the individual chutes, allowing an accumulation of the garbage in the transport duct below each chute, it would not be possible to start a suction operation by creating a low-pressure at one end of a transport duct and at the same time admitting the atmosphere at the other end. The accumulated garbage at the bottom of each chute would thus give rise to a substantial pressure drop, and as the application of the suction technique as a maximum allows a pressure drop between the ends of the duct of one atmosphere, it would not be possible to create the air velocities required for achieving a pneumatic conveyance.

The object of the invention is to devise a garbage suction plant, which is less complicated than the already known plants, and which does not necessarily require the said restraining mechanisms and the said automation.

The plant according to the invention is characterized by the use of valves made to let air into the system and being situated in the wall of the transport duct behind a number of the chutes and/or in the side walls or tops of the chutes, the said valves being made in such a manner that they may open in case of a pressure drop in the plant and then initiate a closing procedure and after a certain time be fully closed.

It is thus possible to achieve an automatic, successive emptying of the chutes consecutively away from the collecting center (the low-pressure source) without the use of controlling gear for the opening of possible restraining mechanisms, unless the chute is excessively tall with a correspondingly great quantity of garbage. If so, the restraining mechanism need not, as in known plants, be airtight. If for instance a valve is mounted behind the chute nearest to the collecting center, the suction operation will be initiated by the occuring pressure drop above the accumulated garbage of this chute, and it will suffice to start the pneumatic removal of the contents of the chute. After a suitable period the valve will close, and the operation be repeated at the next nearest chute. It has been proved that it is unnecessary to have an inlet valve mounted for each chute. It will do, for instance, to place a valve at each fifth chute, and the operation will thus involve the emptying of five chutes at a time.

The plant may further be characteristic in that the individual valve could represent an opening in the wall, made to be closed by way of a plate, which by moving towards the opening may be brought to cover and close it from the outside, and in that there is a corresponding plate at the inside of the opening, and in that the two plates are firmly connected and mounted to allow movements in either direction at right angles to the wall, so that the opening is closed by either one or the other plate in each of the two extreme positions, and in that the plates are spring-loaded against the extreme position, where the inner plate is closing the opening, and in that there is built-in a motion-restraining device like, for instance, a fluid brake acting over an interval in the area at the extreme position, where the outer plate is closing.

A construction of the valves like this will impart to the latter an automatic working operation, as their function will entirely be determined by the air pressure conditions inside the duct. When the plant or the duct is not in a process of discharge, it will be usual to have a slight low-pressure in the duct to prevent any malodorous smells from emerging from the plant. The valves must accordingly be closed, and the spring pressing the valve plates outwards must therefore possess sufficient load to overcome a low-pressure of the said character. When a substantial low-pressure arises inside a given valve, the latter will first open, as the inner plate will immediately move inwards, until the motion-restraining device sets in. The time delaying function of this device will cause that one or several preceding chutes to be emptied, and the said delay of time is naturally dimensioned in a manner sufficient to secure a complete draining of the chute or the shafts ahead. The valve will then close, when the outer plate abuts the valve seat, and the low pressure will thus propagate further into the transport duct, whereby the emptying of the following chute or following series of chutes will automatically be instigated. It should be noticed that these functions may take place automatically without the application of any line connection, for instance, electrical or mechanical from the valves to the center. it will thus be possible, in an inexpensive way, to establish kilometers of transport ducts, which may of course be of great importance to the economy of plants of the said description.

According to the invention the means for maintaining of the garbage in the individual chute may constitute a fork-shaped element with fixed teeth forward-inclining down in the direction of flow and only partially blocking the chute. A construction of the said description will be advantageous in connection with low or medium tall chutes with not too vigorous compression in the bottom of the accumulated heap of garbage. By way of a construction having no movable parts the controlling process is avoided.

The plant may furthermore be characteristic in that the means for maintaining of the garbage in the individual chute constitute a retaining element e.g. fork-shaped, and being constructed so as to block the entire cross section and open by way of swinging or extraction. Such a construction can be advantageous in case of tall chutes with many hatches or intakes, when by accumulation of the garbage a substantial compression will take place at the bottom. By the said embodiment it will be expedient that, according to the invention, an air valve is situated in the chute wall immediately above the restraining element, the former being designed for opening and closing in pace with the restraining element. The sucked-in-air stream will thereby contribute to a continuous loosening of the compact elements of the garbage, and having in this embodiment already automatic control for the restraining element, it will offer no considerable complications to include this great advantage.

In case of plants with both tall and low chutes connected the means for maintaining the garbage in the low chutes can advantageously, according to the invention, be fixed fork-shaped parts, whereas the means for maintaining the garbage in the tall chutes according to the invention can be movable and controllable restraining elements.

Figure 2:
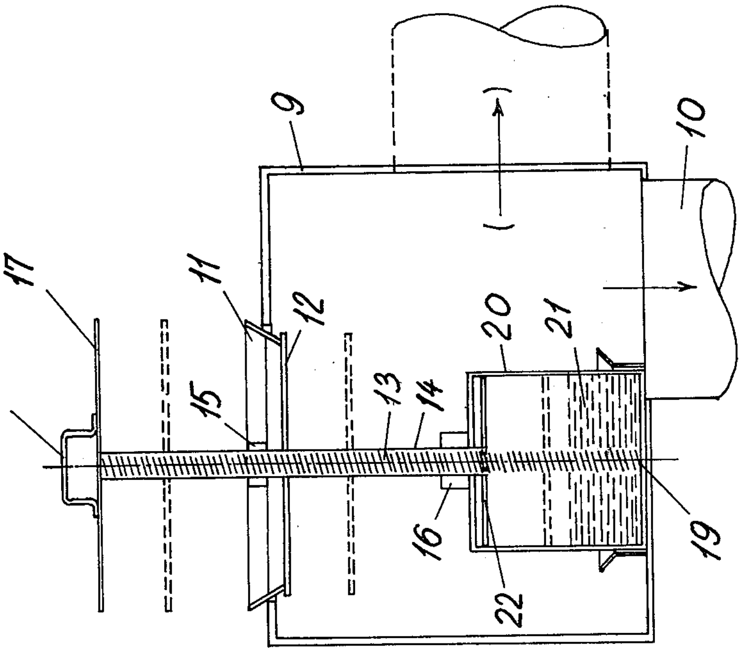
Figure 3:
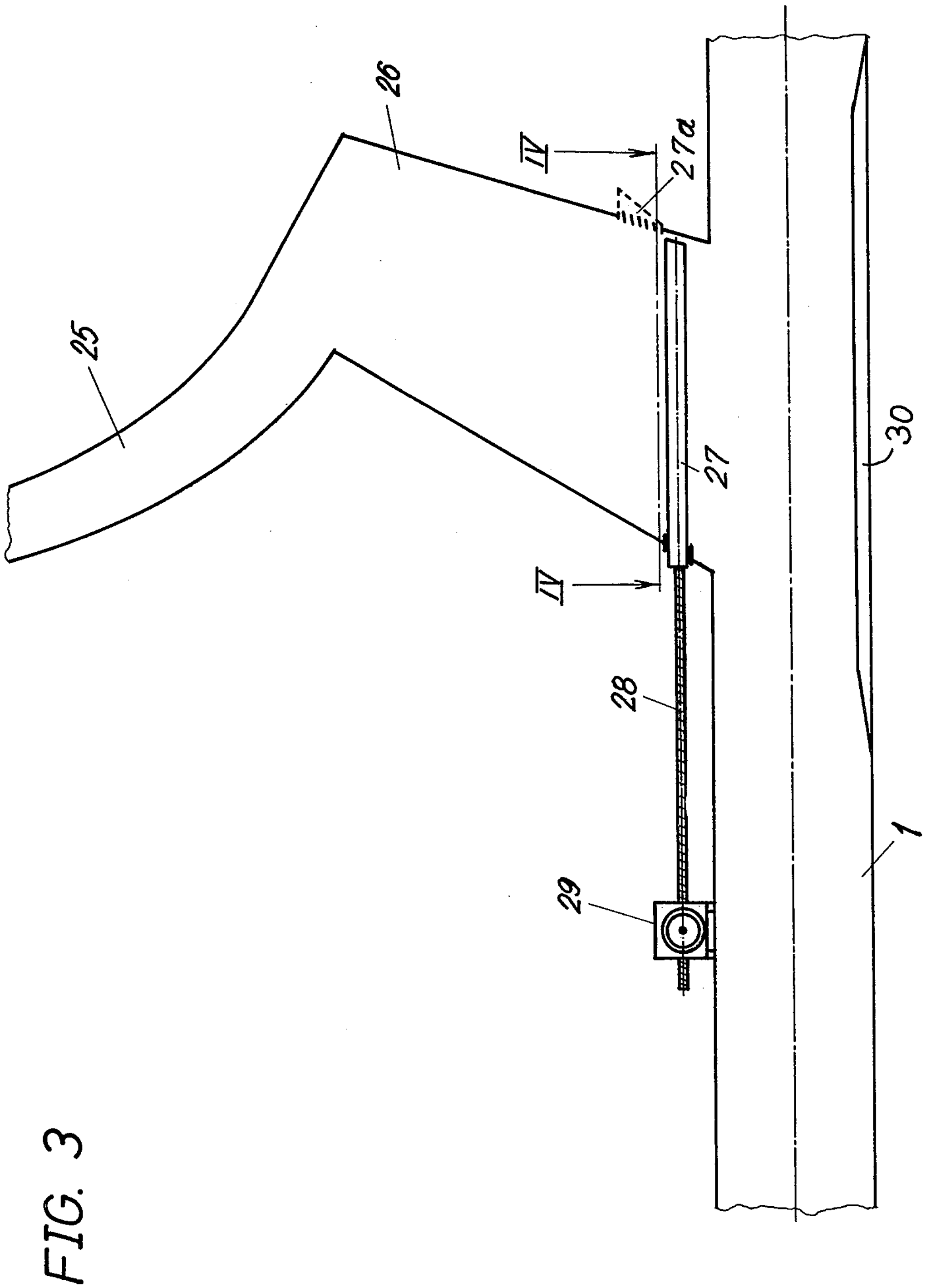
Figure 4:
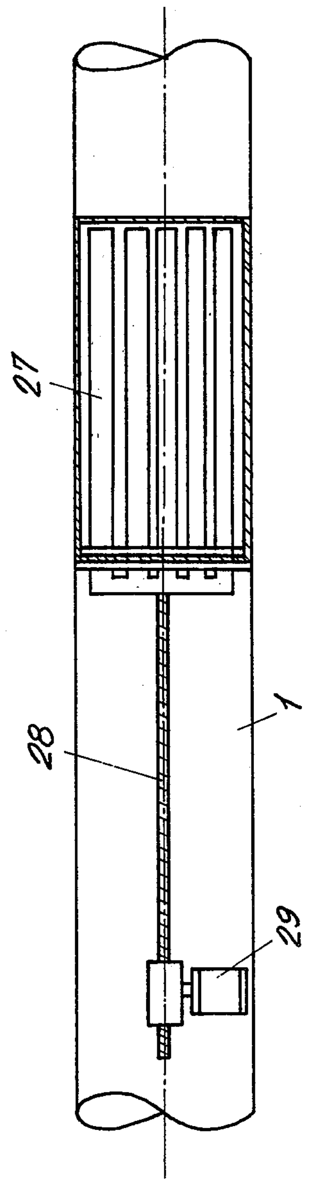

The invention will be further described below with reference to the drawings in which FIG. 1 shows schematically a suction duct and a center for a plant according to the invention, view from one side, FIG. 2 shows a longitudinal section of an air valve according to the invention, FIG. 3 shows a longitudinal section of a suction duct and a chute provided with a controllable restraining element, and FIG. 4 a section along the line IV—IV of FIG. 3.

FIG. 1 shows a mainly horizontally positioned suction duct 1 ending in a collecting reservoir 2, in which may be attained a low-pressure by means of a blower 3. The reservoir 2 is situated in a center and may, in principle, be connected to several ducts equal to duct 1. At the other end of the duct 1 is placed a single spring- or weight-loaded sub-pressure register 4. Leading to the free section of the duct 1 are two garbage chutes 5 and 6. Between these chutes 5 and 6 is mounted an air valve 7, designed to let in under certain circumstances air into the duct 1. The valve 7 can be mounted in such a manner that it emerges into the side or the upper side of the chute, and the position may be immediately near the chute as indicated by the circle 7a. A similar valve 8 can be mounted at the top of the chute 6 as shown schematically. The valves 7 and 8 are constructed as shown in FIG. 2. A valve box 9, by way of a pipe 10, connected to the suction duct 1 or to the upper part of a chute 6. At the opposite side of the valve box 9 has been made an opening with a funnel-shaped inlet 11. The inlet 11 is in the shown position closed by an inner valve plate 12 which, by way of a spring 13, is pressed to abut the inlet from the inside. The plate 12 is firmly connected to a longitudinally displaceable pipe 14 mounted in guides 15 and 16. The spring 13 is mainly enclosed in pipe 14, being set up between the outer end of the pipe 14, to which is fastened an exterior valve plate 17 and a handle 18, and one of the walls of the valve box at the position 19. The interior ends of the pipe 14 and the spring 13 are enclosed in a shock absorber casing 20, which is partially filled with a fluid 21, and the pipe 14 is at its interior end provided with a shock absorber plate 22.

The valve may now act in the following manner:

In case there is no difference of pressure between the interior and the exterior of the valve box 9, the valve will occupy the position indicated by the full-drawn lines of FIG. 2. This will also be the case, if there is a slight low-pressure in the valve box or in the suction duct, because the spring 13 is adequately dimensioned to overcome such a slight low-pressure.

If a vigorous low-pressure occurs in the valve box, the valve plates 12 and 17 and the shock absorber plate 22 will move to the position shown by the dotted line, where the shock absorber plate 22 is in contact with the fluid 21. In this position air will flow from the outside into the valve box 9 through the funnel-shaped inlet 11. The valve plates 12 and 17, the pipe 14 and the shock absorber plate 22 will meanwhile continue the movement inwards or downwards, until the outer valve plate 17 abuts against the outer side of the funnel-shaped inlet 11, where the valve is closed for intake of air to the valve box.

Now the mode of action of the plant shown in FIG. 1 can be explained, as we assume at the bottom of each of the chutes 5 and 6 to be mounted a fork-shaped element 23 and 24 with fixed teeth inclining forwards and downwards into the direction of flow, cf. FIG. 1.

When the collecting reservoir 2 is exposed to a subpressure the valves 7 and the possible valve 8 will immediately open. The garbage remaining around the fork 24 will be aerated by air, partly from the chute 6 and partly from the duct 1, and there will occur a pressure drop above this garbage, equal to that achieved by the blower 3. This will in every case by fully sufficient to carry along the garbage in a pneumatic conveyance to the reservoir 2. After a certain time the valves 7 and 8 will close, and the low-pressure will subsequently propagate further into the system to the chute 5, where the process is repeated. In FIG. 1 are only shown two chutes, but there is principally no limitation in the number of chutes or their distance mutually for a given suction duct. When all chutes are emptied, the low-pressure will reach the outer end of the suction duct 1, at which place is mounted a single spring- or weight-loaded flap valve 4, which will then open to let in air. Thus will be achieved a stationary state of flow conditions, which can be registrated by a manometer in the centre, from where then the blower 3 may be stopped or switched to another suction duct. This may be done automatically. After this all the valves 4, 7 and 8 will move to the opposite extreme positions. It should be noticed that it is not always necessary to work with valves of the kind shown in FIG. 2 in the garbage chutes, which means that the valve 8 will not always be required to obtain the described effect.

Instead of fixed fork-shaped elements like 23 and 24 there may at the bottom of some of the chutes be installed controllable elements as demonstrated in FIG. 3, showing a longitudinal section of a suction duct 1 around the lower end of a chute 25. The chute 25 is here leading to chamber 26, extending downwards towards the suction duct and being at the lower end blocked by a mainly horizontally displaceable fork-shaped element 27, of. likewise FIG. 4, which by means of a spindle 28 and a motor 29 can be pulled out of the chamber 26, by which the garbage accumulated in the chamber 26 can be released. Immediately above the displaceable fork element 27 may be placed in the wall of the chamber 26 a controllable air valve 27a, designed for opening and closing in pace with the element 27. Hereby is achieved an efficient release of the garbage, when the element 27 is pulled out, as individual parts of the garbage will easily be released and caught by the air stream entering through the valve 27a. A construction of this description can advantageously be applied in tall garbage chutes with many hatches. The motor 29 can be controlled from the center. It should be noticed that this construction may with benefit be used in combination with the first mentioned, when the plant is serving an urban area with different buildings comprising both apartment houses and villas.

On the bottom of the transport duct 1 there may below the chute be placed several mutually parallel, longitudinal rails 30. Such rails may offer an opportunity of the air easier penetrating under the material situated on the bottom of the transport duct, and thus a more efficient pneumatic conveyance of the material can be achieved.

I claim:

1. A garbage suction plant using an air suction system and having a number of garbage chutes connected to a common, substantially horizontal transport duct leading to a collecting centre having air suction equipment for creating a suction effect through the duct and the chutes, a plurality of air inlet valve arrangements being provided at predetermined locations of the duct which are situated further away from the collecting centre than connection points of at least some of the garbage chutes, each of said valve arrangements being adapted for opening under the influence of the suction effect in the transport duct and subsequent closing after a predetermined period of time, each of said plurality of air inlet valve arrangements comprising two interconnected valve plates each adapted for closing an opening communicating with said air-suction system, and means for resiliently urging a first of said valve plates against an inner wall surface surrounding said opening, a second of said valve plates being adapted for being urged against an outer wall surface surrounding said opening under influence of said air suction, said valve arrangement being further connected to damping means adapted for determining said predetermined time between opening said first valve plate and closing said second valve plate against the wall opening.

2. A garbage suction plant using an air suction system and having a number of garbage chutes connected to a common, substantially horizontal transport duct leading to a collecting centre having air suction equipment for creating a suction effect through the duct and the chutes, a plurality of air inlet valve arrangements being provided at predetermined locations of the duct which are situated further away from the collecting centre than connection points of at least some of the garbage chutes, each of said valve arrangements being adapted for opening under the influence of the suction effect in the transport duct and subsequent closing after a predetermined period of time and means for restraining the garbage being provided in each individual chute, said means comprising a fork-shaped element with fixed teeth inclining downwards and forwards in the direction of flow and only partially blocking the chute.

3. A garbage suction plate using an air suction system and having a number of garbage chutes connected to a common, substantially horizontal transport duct leading to a collecting centre having air suction equipment for creating a suction effect through the duct and the chutes, a plurality of air inlet valve arrangements being provided at predetermined locations of the duct which are situated further away from the collecting centre than connection points of at least some of the garbage chutes, each of said valve arrangements being adapted for opening under the influence of the suction effect in the transport duct and subsequent closing after a predetermined period of time, means being provided for retaining the garbage in an individual chute, said means comprising a fork-shaped retaining element adapted to block the entire cross section of the chute and to open by way of extraction, and an air valve being positioned in the chute wall immediately above the retaining element, the former being designed for opening and closing in phase with the retaining element.

4. A garbage suction plant using an air suction system and having a number of garbage chutes connected to a common, substantially horizontal transport duct leading to a collecting centre having air suction equipment for creating a suction effect through the duct and the chutes, air inlet valve arrangements positioned at predetermined locations in bottom portions of selected ones of the garbage chutes, said valve arrangements being adapted for opening under the influence of the suction effect in the transport duct and subsequent closing after a predetermined period of time, and means for restraining the garbage in each individual chute, said means consisting of a fork-shaped element with fixed teeth inclining downwards and forwards in the direction of flow and only partially blocking the chute.

5. A garbage suction plant as defined in claim 4 further including an air inlet valve arrangement positioned at a predetermined location in one of the ducts situated further away from the collecting centre then the connection point of one of the garbage chutes.

* * * * *